United States Patent Office 2,908,669
Patented Oct. 13, 1959

2,908,669

POLYMERIZATION OF OLEFINS WITH METAL OXIDE CATALYSTS PROMOTED BY ALKALI METAL ALKYLS

Hugh J. Hagemeyer, Jr., and Marvin B. Edwards, Longview, Tex., assignors to Eastman Kodak Company, Rochester, N.Y., a corporation of New Jersey No Drawing. Application October 18, 1956
Serial No. 616,618

17 Claims. (Cl. 260—93.7)

This invention relates to the polymerization of α-olefins and is particularly concerned with an improved polymerization process whereby α-monoolefins of 2–10 carbon atoms are polymerized to high molecular weight polymers of improved crystallinity and in improved yield. More specifically, the invention relates to the use of alkali metal alkyls as promoters in polymerization processes wherein α-monoolefinic hydrocarbons are polymerized by means of solid catalysts comprising a partially reduced oxide of a metal from Group 5a or Group 6a of the Mendeleeff Periodic Table, i.e. one or more of the oxides of molybdenum, vanadium, chromium, tungsten, and the like.

The polymerization of ethylene in particular and in some instances mixtures of ethylene and propylene or propylene alone using group 5a or group 6a metal oxides as catalysts is disclosed in detail in U.S. 2,691,647; 2,710,854; 2,725,374; 2,726,231; 2,726,234; 2,727,024; 2,728,757; 2,728,758; 2,731,452 and 2,731,453. All of these patents are concerned with a group 5a or a group 6a metal oxide as a polymerization catalyst for ethylene using in combination with the metal oxide catalyst a promoter such as an alkali metal, an alkaline earth carbide, an alkali metal hydride, an alkaline earth metal, an alkali metal aluminum hydride, a metal borohydride, an alkaline earth metal hydride or a complex metal aluminum hydride promoter. These various combinations are effective in polymerizing ethylene to highly crystalline polymer of greater density than the polyethylene obtained by the usual high pressure polymerization processes, and some of the catalyst-promoter combinations serve to polymerize propylene to some extent to solid polymer, although the yields are low and the amount of isotactic or syndotactic polymers resulting from the polymerization is usually relatively small, and the product is largely the atactic polymer of relatively low crystallinity.

For commercial practice, it is desirable that the yield of polymer per part of catalyst be as high as possible in order to save on catalyst cost and to obtain the highest weight yields of polymer possible with given equipment. In the case of all of the α-monoolefins of 2–10 carbon atoms, and particularly the higher α-monoolefins containing 3–10 carbon atoms, it is particularly desirable that the polymer not only be formed in good yield but that the product be highly crystalline in nature, i.e. either isotactic or syndotactic, in order that the optimum properties be developed in the polymer such as density, melting point, tensile and stiffness. Generally ethylene is more readily polymerized to a high density, highly crystalline form than are the higher α-monoolefins, and in most cases known to the art, catalysts which are effective to form high density polyethylenes are usually only partially effective or wholly ineffective for forming highly crystalline polyolefins from the monomers containing 3–10 carbon atoms such as propylene, butene-1, pentene-1, 3-methylbutene-1, 4-methylpentene-1, 4-methylhexene-1, 5-methylhexene-1, 4,4-dimethylpentene-1, and similar higher α-monoolefins. Even in the case of the lowest member of the series, i.e. ethylene, high density polymers can be obtained using the group 5a and group 6a metal oxides rather readily, but it is desirable to increase the yield of polymer obtained not only from economic considerations but also to minimize the amount of catalyst remaining in the polymer after polymerization since such catalyst must be removed in order to minimize discoloration of the polymer. The virtues of obtaining highly crystalline polyolefins are well known to the art and are readily illustrated by the differences obtained in melting points between the atactic polymers of low crystallinity and the isotactic or syndotactic polymers of high crystallinity. For example, the usual high pressure polyethylene has a density of about 0.92 and a melting point not much higher than the boiling point of water. Consequently, the usual polyethylene of low density and low crystallinity softens and undergoes deformation in contacting boiling water. In contrast to this, the highly crystalline polyethylene which is obtained by polymerization with a group 5a or group 6a metal oxide and having a density of about 0.97 has a melting point of 137° C. In like manner atactic polypropylene has a density of 0.85 and a melting point of 80° C. whereas the highly crystalline isotactic polypropylene has a density of 0.92 and a melting point of 165° C. Atactic polybutene-1 has a density of 0.87 and a melting point of 62° C. whereas isotactic polybutene-1 has a density of 0.91 and a melting point of 128° C. The production of highly crystalline polymers is thus of great importance in the polyolefin field since it is possible to obtain polymers of greatly improved properties and greatly increased melting point by obtaining the polymers in highly crystalline form. This makes possible the production of high melting molded and extruded articles which also exhibit stiffness or rigidity characteristics which are more than twice as high as those for the conventional atactic polymers. For example, the isotactic poly-3-methylbutene-1 has a melting point of more than 250° C., isotactic poly-4-methylpentene-1 has a melting point above 200° C. and isotactic poly-4,4-dimethypentene-1 has a melting point above 300° C. These greatly improved properties make it possible to use the highly crystalline polymers for the molding of relatively stiff articles and makes the polyolefins of great utility in such fields as extruded tubing, molded articles of all kinds, fibers, and yarns, and films and sheetings. As has been indicated, the metal oxides defined herein and particularly the partially reduced group 5a and group 6a metal oxides when employed with a promoter such as described in the above-noted patents give excellent polyethylene but give higher polyolefins in much reduced yields and usually containing large amounts of atactic polymer.

It is accordingly an object of this invention to provide a new and improved process wherein the group 5a or group 6a metal oxide catalysts are employed in conjunction with hitherto unused activators to give catalyst systems of greatly increased activity whereby much faster polymerization rates are achieved and many times more polymer is produced per unit weight of catalyst when polymerizing not only ethylene but also propylene and the other higher α-monoolefins containing 2–10 carbon atoms.

Another object of the invention is to provide a process whereby highly crystalline polymers are readily obtained, and particularly wherein polypropylene and the higher polyolefins are readily produced in excellent yield and in highly crystalline form.

Another object of the invention is to provide a new and improved class of promoters for the partially reduced metal oxide catalysts for use in polymerizing the normally gaseous α-monoolefins to solid polymer without the concomitant formation of objectionable amounts of relatively low molecular weight greases or waxes.

Another object of the invention is to provide a new and improved process for converting the normally gaseous α-monoolefins to solid highly crystalline products in high yield at relatively low temperatures and pressures whereby the commercial manufacture of isotactic polyolefins is greatly faciliated.

Other objects will be apparent from the description and claims which follow.

These and other objects are attained by means of this invention as described in detail hereinafter with particular reference to certain preferred embodiments thereof. In general, the process embodying the invention is concerned with the use of alkali metal alkyls as activators in the polymerization of polymerizable hydrocarbon materials consisting of one or more normally gaseous α-monoolefins using a partially reduced oxide of a metal from group 5a or group 6a as polymerization catalyst. Quite unexpectedly, the alkali metal alkyls give unusually fast polymerization rates when used in conjunction with group 5a or group 6a metal oxides in partially reduced form, the yields of polymer per gram of catalyst are unusually high, and the catalyst mixtures are useful not only for polymerizing ethylene but also for polymerizing propylene and higher α-monoolefinic hydrocarbons to highly crystalline polymers in excellent yield. Any of the alkali metal alkyls can be used in practicing the invention, and the sodium and lithium alkyls containing 1–10 carbon atoms are desirably used with the lithium alkyls being preferred, although the potassium alkyls can be used with good results. The alkali metal alkyl activators embodying the invention can be used in combination with any of the group 5a or group 6a metal oxides as described in the patents referred to hereinabove but are desirably employed as activators for the partially reduced oxides of one or more of molybdenum, vanadium, tungsten, or chromium. The other group 5a or 6a metal oxides can also be used such as the partially reduced uranium oxides, niobium oxides or tantalum oxides although such oxides are less preferable both from the economic standpoint and the standpoint of yield of polymer. The catalyst combinations preferably employed in praticing the invention are the combinations wherein the activator consists of sodium or lithium alkyls of 1–5 carbon atoms in combination with partially reduced molybdenum oxide, chromium oxide, tungsten oxide or vanadium oxide. The combinations which give optimum results and which are preferably employed are the lithium alkyls when used in combination with molybdenum oxide or vanadium oxide in partially reduced form.

The process embodying the invention can be effected over a relatively wide temperature range such as at temperatures of from 75° C. to about 325° C., but the process is desirably effected between about 100° C. and 260° C. for optimum results. In like manner, the process is operable over pressures ranging between about atmospheric pressure and 20,000 p.s.i. or higher, but optimum results are achieved at pressures of at least 200 p.s.i., and the preferred range for commercial operation is from about 200 to about 2000 p.s.i.

The partially reduced metal oxides of group 5a or group 6a are discussed in considerable detail in the patents referred to hereinabove, and the disclosures of such patents with reference to the metal oxides, their partial reduction, their physical form, their preparation, and their use with or without a support are incorporated herein. The various aspects of use of the group 5a and group 6a metal oxides used in practicing this invention are as described in such patents, and the invention herein resides in the use of such metal oxides under the conditions already known but in combination with the alkali metal alkyls as herein defined to give the unexpectedly good results described herein.

The process embodying the invention is desirably effected in an inert organic liquid vehicle and under pressure at least sufficient to maintain the vehicle largely in liquid form during the polymerization. The catalysts and activators used in practicing the invention make it possible to carry out the polymerization processes either batchwise or continuously. The metal oxide catalyst can be slurried in the polymerization medium but is desirably spread or supported upon a suitable support which is desirably one of the difficultly reducible metal oxides. When a continuous process is employed, the activator of the invention can be dissolved in the vehicle together with the monomer or monomers being polymerized and the resulting mixture passed continuously over or through a bed of the metal oxide catalyst. Suitable supports for the partially reduced metal oxide catalysts employed in practicing the invention are alumina, titania, and zirconia which are preferably employed, although such other supports as silica-alumina, aluminosilicates, active clays, silica gel, kieselguhr, and even absorptive carbon can be used in some cases although such supports are less preferable than the alumina, titania or zirconia supports. The process can be employed to effect either homopolymerization or copolymerization of any of the normally gaseous α-monoolefins and particularly the aliphatic straight or branched chain aliphatic α-monoolefins containing 2–10 carbon atoms. The invention is particularly applicable for forming normally solid highly crystalline polymers from ethylene, propylene, mixtures of ethylene and propylene, or mixtures or either or both of these materials with the higher α-monoolefins and particularly those containing 5–10 carbon atoms such as 3-methylbutene-1, 4-methylpentene-1, 4,4-dimethylpentene-1, and similar higher olefins, although the invention is also applicable for polymerizing such materials as butene-1, pentene-1, heptene-1, and similar α-monoolefins. The homopolymers of these and similar α-monoolefins are usually employed in commercial practice, although the catalytic processes such as herein defined make possible the preparation of a wide variety of copolymeric products from two or more of the α-monoolefins to give a wide range of properties which can be tailored to the particular use to which the polymer will be put.

The use of the alkali metal alkyl activators in the process embodying the invention has several important advantages over the use of the activators employed heretofore in conjunction with the group 5a or group 6a metal oxide catalysts. In the first place, the catalyst-promoter systems of the present invention are very active and generally give faster polymerization rates than any of the metal oxide systems known heretofore as well as giving high yields of polymer amounting usually to from 3 to 10 times the amount per unit weight of catalyst produced according to the prior art processes. Another and particular advantage of the catalyst combinations of this invention is that highly crystalline polymers of propylene and the other higher α-olefins are readily prepared whereby the same catalyst system can be used for polymerizing any of the α-monoolefins as described herein under generally comparable conditions. These highly crystalline, high molecular weight polyolefins possess high softening temperatures, high stiffness and high tensile strength, which make them extremely useful in commercial plastic and fiber applications. Another advantage of the activators of this invention is that they are not only extremely active but they are soluble in the usual organic solvents employed as vehicle and thus can be readily separated from the polymer formed during the polymerization. This greatly facilitates the clean-up of the polymer particularly because the polymer contains no unreacted alkali metal which must be removed. The high activity of the activators or promoters embodying the invention makes it possible to use such materials in much smaller amounts than was ordinarily possible heretofore with the activators or promoters known to the art. Generally, the promoters embodying the invention are used in molar amounts of from equal to, to about 10 times the molar amount of the group 5a or group 6a metal oxide. Higher molar ratios of promoter to catalyst can be employed, but such higher ratios are not necessary since no increase in activity is observed using such higher amounts. The use of promoter-catalyst mole ratios of from 1:1 to 10:1 in accordance with this invention is in sharp contrast to the processes wherein alkali metals or metal hydrides are employed as promoters wherein it is ordinarily necessary to use excesses of the activator or promoter over the metal oxide of the order of 30 to 100 molar equivalents for optimum activity.

The promoter-catalyst combinations of the invention have several other significant advantages which make them of particular utility in commercial practice. The high yields of polymer make commercial production in volume entirely feasible. The catalyst systems function well in the presence of large amounts of the liquid vehicle which is of particular advantage in batch processes wherein the formation of polymer raises the viscosity of the reaction mixture to the point where polymerization stops before the catalyst becomes unreactive. The catalyst systems of the invention retain their activity for prolonged periods of time, and the metal oxides can be readily reactivated or regenerated as described in the patents referred to hereinabove as well as in U.S. 2,702,288 and 2,728,754.

The exact method by which the alkali metal alkyls function in the process is not understood, and the invention will not be limited by any theory which might be advanced by way of explanation. It is known that the alkali metal alkyls are not themselves catalysts for ethylene which is the most readily polymerizable of the α-olefins and certainly not for the higher α-olefins such as propylene. Furthermore, the reduced metal oxide catalysts are largely ineffective without the use of a promoter whereas the combination defined herein is an extremely active combination and also apepars to have a high degree of stereospecificity whereby the polymerization is directed to formation of the highly crystalline isotactic or syndotactic polymers rather than to the actactic polymers. This stereospecificity is particularly pronounced in the case of the lithium alkyls, and this is a particular advantage since the lithium alkyls also give optimum yields of polymer per unit of catalyst which parallels the activity of lithium metal when used as an activator with the metal oxides.

In general, the polymerization rate increases with the mole ratio of promoter to catalyst whereas the degree of crystallinity depends more on the nature of the alkali metal alkyl and metal oxide employed in the catalyst combination. Thus, the lithium alkyls are desirably employed in combination with reduced molybdenum oxide when it is desired to prepare polyolefins which are predominantly isotactic. The sodium and potassium alkyls give excellent yields of polymer but usually give a lower degree of crystallinity with the higher polyolefins from propylene on up. The mole ratio of promoter to catalyst in accordance with the invention should be at least 1:1, although the mole ratio can be increased anywhere over the range of from 1:1 to 10:1 or higher with excellent results. The concentration of catalyst in the reaction vehicle is not critical and can be varied widely although optimum results are obtained using concentrations of the metal oxide of from 0.02% to 1.5% based on the weight of vehicle. Higher or lower catalyst concentrations can be used, and the highest yields of polymer per unit weight of catalyst are obtained at high solvent to catalyst ratios because of the impaired ability of the solvent to remove polymer from the catalyst surface at higher polymer concentrations. Catalyst can be removed from the polymer by filtration of the hot polymer solution. The filtration step is greatly simplified when preceded by a settling step wherein the hot polymer solution is allowed to deposit the bulk of the catalyst in a quiescent zone before filtration. The polymer can be readily recovered by cooling the filtrate and collecting, washing and drying the precipitated polymer powder in accordance with usual practice. The solubility of the alkali metal alkyl promoters makes their removal from the polymer powder relatively simple by use of any of the well known organic solvents.

When a supported metal oxide catalyst is employed in accordance with the preferred practice of the invention, the relative proportions of support to metal oxide can be varied widely since such proportions are not critical. Thus, the relative proportions can be varied from about 1–99% by weight to 99–1% by weight with oxide-support ratios in the range of about 1:20 to 1:1 being preferably used and ratios of approximately 1:10 being desired for optimum activity. The preferred support is alumina containing about 1 to 80% and preferably about 5–35% or desirably 10–15% of a metal oxide supported thereon. The preparation of supported metal oxides such as are employed in practicing the invention is described in detail in U.S. Patent No. 2,726,234 and the references referred to therein. Furthermore, the catalyst may be stabilized with silica, aluminaorthophosphate or other known stabilizers or modifiers, and the catalyst can contain calcium oxide, zirconia or titania as discussed in such patent or minor amounts of other metal oxides such as the oxides of magnesium, nickel, zinc, thorium, iron, etc. The catalyst systems of this invention are active only when the metal oxide catalyst is reduced below its maximum valence state. In the case of molybdenum, for example, the maximum valence state is 6, and active catalysts of this invention contain molybdenum in an average valence state of from 2 to 5.5. The reduction of molybdenum oxide can be carried out at 25–250° C. by using an excess of activator. Generally, however, it is advantageous to reduce the oxide with hydrogen gas at 300–800° C. since a flowing hydrogen stream at these temperatures removes the water formed in the reduction. The presence of water during the polymerization is quite objectionable since it serves to inactivate the alkali metal alkyl promoters. The vanadium, chromium and tungsten oxides are preferably thermally reduced in an oxidizing atmosphere. The preparation of partially reduced metal oxides which are suitably employed is described in detail in U.S. Patents Nos. 2,691,647 and 2,727,024 as well as in other references referred to herein.

In practicing the invention, any of the well known inert organic liquid vehicles can be employed with the organic liquids which contain no combined oxygen and preferably the liquid hydrocarbons being employed for best results, although halogenated hydrocarbons also serve as excellent reaction vehicles. Suitable solvents include the alkanes such as propane, pentane or heptane, the aromatic hydrocarbons such as benzene, toluene or xylene; and halogenated hydrocarbons such as trichloroethane or chlorobenzene. Petroleum fractions of suitable boiling range such as Stoddard solvent, kerosene or gasoline can also be used as well as any of the other well known inert solvents which are free of combined oxygen as well as water, alcohol, ether or other compounds containing oxygen. Other suitable solvents include such materials as ethylbenzene, isopropylbenzene, ethyltoluene, n-propylbenzene, diethylbenzenes, mono- and dialkyl naphthalenes, n-octane, isooctane, methylcyclohexane, tetralin, decalin, and any of the other well known inert liquid organic vehicles.

The pressure employed in the polymerization process can be achieved in any desired manner but is readily achieved by pressuring the reactor with the monomer to be polymerized and continuously adding monomer to the system in order to maintain the pressure at the desired level throughout the course of the polymerization. When a continuous process is employed, a polymerization mixture of constant composition and consisting of the vehicle, monomer or monomers and activator is continuously and progressively introduced into the polymerization zone and passed over the partially reduced metal oxide catalyst, and the mixture resulting from the polymerization is continuously and progressively withdrawn from the polymerization zone in amounts correlated and equivalent to the rate of introduction, whereby polymer of extremely uniform molecular weight desirable over a relatively narrow range is obtained. The ethylene, propylene or other α-monoolefin can be charged to the polymerization mixture either as a pure material or in admixture with other polymerizable or nonpolymerizable materials such as other α-monoolefins or such materials as hydrogen or saturated hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

The amount of vehicle employed can be varied over wide limits relative to the monomer. The concentration of the monomer in the vehicle will depend upon the reaction conditions and will usually range from about 2 to about 50% by weight, or preferably from about 2 to about 10% by weight based on the weight of the vehicle. Concentrations of monomer in the vehicle of about 3–7% by weight are commonly employed although higher concentrations ordinarily increase the rate of polymerization. Concentrations above 5–10% by weight are ordinarily less desirable because of the viscosity of the solution resulting from the polymerization. The polymerization time can be varied as desired from a period of a few minutes or hours to several days. When a continuous process is employed, the contact time is relatively short, and the vehicle, unused catalyst and unreacted monomer is cycled through the system whereby substantially complete polymerization results.

The invention is illustrated by the following examples of preferred embodiments thereof, and the advantages of the invention are clearly evidenced by the examples given of other well known catalyst, activator systems used heretofore wherein the improved results obtained in accordance with this invention are in sharp contrast to those obtained in such prior art processes. It will be understood that the examples are merely illustrative and are not intended to limit the scope of the invention unless otherwise specifically indicated.

EXAMPLE 1

A commercial sample of molybdenum oxide on gamma-alumina (10% $MoO_3$) was partially reduced according to the following procedure. A 100 g. portion of the supported catalyst having a particle size of 100 mesh was charged to a 1-inch vertical Vycor tube having a length of 2 feet, and the tube was heated in a muffle furnace at 480° C. as measured by a thermocouple in the catalyst bed while a stream of hydrogen was passed upwardly through the catalyst bed at a rate of 0.5 to 1.0 liter per minute for a period of 16 hours. The resulting partially reduced catalyst was then cooled with hydrogen still flowing over the catalyst and transferred to a nitrogen-filled dry box. All catalyst weighings and transfers were made in a nitrogen atmosphere.

A 27 g. portion of this reduced molybdenum oxide catalyst was added to a suspension of 3.65 g. of sodium amyl in 1.75 liters of xylene, and the mixture was transferred to a 3.5-liter stirred autoclave. The xylene had been previously purified by refluxing 1000 parts of the xylene with 2–3 parts of calcium hydride and 2–3 parts of partially reduced molybdenum oxide catalyst supported on alumina for 16 hours and then distilling the xylene in an inert atmosphere. The autoclave was heated to 230° C., and ethylene was charged to a pressure of 1500 p.s.i. Polymerization was conducted at 230° C. for 3 hours. Fresh ethylene was added to restore the pressure to 1500 p.s.i. whenever the pressure fell to 1000 p.s.i. At the end of the polymerization period, the resulting polyethylene was removed from the autoclave, washed thoroughly with hot methanol and dried to give 279 g. of product. This polymer was then purified by dissolving in boiling xylene and filtering under nitrogen pressure through Celite-coated filter cloth supported on 200-mesh wire gauze. The clear filtrate was cooled to room temperature, and the precipitated polyethylene was collected by filtration in the form of a fine powder. Traces of organic solvent remaining in the polymer were removed by steam distillation, and the dried purified polymer had a melt index of 0.07, a specific gravity of 0.962, a stiffness in flexure of 112,000 p.s.i., a Vicat softening point of 133.8° C. and an ash content of 0.015%. As can be seen from the properties, this polymer was extremely crystalline, the crystallinity being above 90% as shown by X-ray diffraction, and the polymer was not contaminated with low molecular weight waxes or greases. The yield of crystalline polyethylene was thus more than 10 parts by weight of polymer per part by weight of the supported catalyst and more than 100 parts by weight of polymer based on the weight of the partially reduced molybdenum oxide.

It is thus apparent that the catalyst-promoter combinations of this invention give excellent results in forming high density polyethylene of improved softening point and stiffness. One of the particular values of the catalyst combinations embodying the invention is their ability to form high yields of highly crystalline polypropylene and other higher α-monoolefins wherein many of the reduced metal oxide catalysts with different activators are largely or wholly ineffective. This important advantage is illustrated by the following example.

EXAMPLE 2

A 12 g. portion of the molybdenum oxide catalyst which was partially reduced as described in Example 1 was added to 1000 ml. of purified isooctane containing 1.28 g. of lithium butyl. The catalyst mixture was transferred to a nitrogen-filled stirred autoclave of 2 liters capacity. Nitrogen in the autoclave was displaced with propylene until a propylene pressure of 100 p.s.i. was obtained when the autoclave was heated to 180° C. Liquid propylene was then pumped into the autoclave until the pressure reached 1000 p.s.i., and the reaction was carried out at 800–1000 p.s.i. and at 180° C. for 10 hours. Fresh propylene was pumped in periodically to keep the pressure within the desired limits. The autoclave was then cooled to room temperature and emptied, and 500 ml. of methanol was added to the polymerization mixture to complete the precipitation of the polymer. The polypropylene obtained was filtered from the solution, washed repeatedly with methanol and dried to constant weight to give 165 g. of a somewhat rubbery polymer. Residual catalyst was removed from the polymer by dissolving the product in boiling xylene and filtering as described in Example 1. Methanol was added to the clear filtrate to ensure complete precipitation. The resulting polymer was then fractionated to separate the atactic portions from the isotactic portions by extraction in a Soxhlet apparatus for 16 hours with acetone, diisopropyl ether, and heptane. This extraction left 58% of unextracted polypropylene which was essentially 100% isotactic crystalline polypropylene, and the acetone soluble fraction amounted to 12%, the diisopropyl ether soluble fraction amounted to 22% and the heptane soluble fraction amounted to 8%. The properties of the catalyst-free polypropylene were: melt index, 8.1; specific gravity, 0.921; Vicat softening point, 127.4° C.

The important advantage of the alkali metal alkyl promoters in forming highly crystalline polypropylene and higher polyolefins is evident from the following data wherein other well known promoters for reduced metal oxide catalysts were substituted for the alkali metal alkyl promoters of this invention. For example, 3 g. of the partially reduced molybdenum oxide catalyst supported on alumina as described and 0.6 g. of sodium hydride in 50 ml. of Decalin was heated at 150° C. in a 100-ml. autoclave under a propylene pressure of 500 p.s.i. and a hydrogen superpressure of 300 p.s.i. for four hours according to the best practice disclosed in the prior art. Although these conditions are quite effective for forming polyethylene, no solid polypropylene could be detected when the Decalin was diluted with 3 volumes of methanol. When the experiment was repeated using 2.3 g. of sodium amyl in accordance with this invention in place of the sodium hydride, the yield of solid polypropylene was 9.4 g. Similar differences were observed when using sodium metal as activator or calcium hydride as activator in the polymerization of propylene. It is thus apparent that the catalyst-promoter combinations of this invention not only polymerize ethylene to solid polymer in excellent yields, but, unlike the catalyst-promoter combinations of the art, also polymerize propylene to solid polymer containing a predominant portion of isotactic polypropylene under similar conditions. The unusually high melting point of polypropylene and the other higher polyolefins makes it highly desirable that the catalysts which are effective for forming high density polyethylene also be effective for forming highly crystalline higher polyolefins.

EXAMPLE 3

The following table illustrates the improved results which are obtained using other partially reduced metal oxides as defined herein in combination with the alkali metal alkyls. The chromium oxide, vanadium oxide, and tungsten oxide catalysts each contained 0.07 mole of hexavalent oxide per hundred grams of catalyst so as to have the same molar concentration of active metal oxide as the 10% molybdenum oxide-alumina catalyst described in the preceding examples. The catalysts were prepared by impregnating 100-mesh gamma-alumina with chromium trioxide, ammonium metavanadate and sodium tungstate solutions respectively. The catalysts were dried at 110° C., roasted in air at 300° C. and finally reduced with hydrogen at 480° C. as described in Example 1. The polymerization in each case was effected at 230° C. and 800–1000 p.s.i. ethylene pressure for 4 hours.

81 g. of polyethylene of specific gravity 0.962 was obtained, and when the sodium metal was replaced with an equimolar amount of calcium hydride, only 116 g. of polyethylene of specific gravity 0.969 was obtained. In contrast to this, when an equivalent amount of sodium amyl was employed with the partially reduced molybdenum oxide catalyst, the yield of polyethylene of specific gravity 0.966 was increased to 329 g.

It is thus apparent that the catalyst systems of this invention give greatly increased polymer yields over the prior art catalyst systems even with polyethylene which is the most readily produced of the polyolefins as well as giving highly increased results in forming polypropylene and higher polyolefins.

EXAMPLE 4

According to Example 28 of U.S. Patent 2,731,452, polypropylene can be prepared by use of a metal oxide catalyst and an alkaline earth hydride promoter. When 4 g. of partially reduced 10% molybdenum oxide-alumina catalyst, 1 g. of calcium hydride and 50 g. of Decalin was heated at 160° C. in a 100 ml. autoclave under a propylene pressure of 500 p.s.i. for 6 hours, a 1.2 g. yield of sticky, elastic polypropylene was obtained by precipitation of the product from the reaction mixture with methanol.

In contrast to this, the process was repeated using an equivalent amount of the lithium butyl of the present invention in place of the calcium hydride promoter, and the yield of solid polypropylene was 21 g. or an increase in yield of nearly 15 fold. Preferred embodiments of the process embodying the present invention in the polymerization of propylene are set out in the following two examples.

EXAMPLE 5

A 2-liter stirred autoclave was charged with 7 g. of amyl sodium, 27 g. of partially reduced 10% molybdenum oxide-alumina catalyst and 1000 ml. of purified xylene. The autoclave was heated to 190° C. and propylene was pumped in until the pressure amounted to 1000 p.s.i. Polymerization was continued at 190° C. for 12 hours. The autoclave was cooled and emptied and

*Table 1*

| Catalyst | Activator | Temp., °C. | Pressure, p.s.i. | Grams Polymer | Spec. Gravity |
|---|---|---|---|---|---|
| 2.0 g. 12.7% $V_2O_5$–$Al_2O_3$ | 0.82 g. AmNa | 230 | 1,000 | 238 | 0.957 |
| 2.0 g. 7% $Cr_2O_3$–$Al_2O_3$ | 0.82 g. AmNa | 230 | 1,000 | 204 | 0.962 |
| 2.0 g. 16% $WO_3$–$Al_2O_3$ | 0.82 g. AmNa | 230 | 1,000 | 188 | 0.966 |
| 2.0 g. 12.7% $V_2O_5$–$Al_2O_3$ | 0.55 g. LiBu | 230 | 1,000 | 255 | 0.971 |

The activators listed in the table are sodium amyl and lithium butyl respectively. The results achieved from the standpoint of polymer yields are especially striking when it is considered that the polymer yields are 2 to 3 times greater than when alkali metals or metal hydrides are used as promoters under exactly the same conditions even though the amount of promoter was decreased by a factor of 10 in employing the alkali metal alkyls.

This increase over the results obtained with other promoter-catalyst combinations is illustrated by the fact that when the process described in Table 1 was repeated using a catalyst combination consisting of 2 g. of 100 mesh 10% molybdenum oxide-alumina catalyst (reduced as in Example 1), 2 g. of sodium metal and 100 ml. of xylene at 230° C. and 800–1000 p.s.i. ethylene pressure, the weight of polyethylene obtained was only 110 g. of material having a specific gravity of .965. As can be seen from Table 1, this yield is greatly lower than the yields obtained with the catalysts embodying this invention even though the amount of activator employed was much greater.

When the process was repeated replacing the sodium metal with an equimolar amount of sodium hydride, only the polypropylene precipitated by the addition of 3000 ml. of methanol. The yield of solid polypropylene was 120 g. This polymer had excellent characteristics although it consisted predominantly of atactic solid polypropylene as shown by extraction.

EXAMPLE 6

When the highly crystalline higher polyolefins are desired, we have found that the use of lithium alkyl activators is preferred since they provide a greater degree of stereospecificity. Thus, when the amyl sodium promoter of the preceding example was replaced by an equivalent molar amount of lithium butyl (4.8 g.), 248 g. of solid polypropylene was obtained. Thus the use of lithium alkyl instead of sodium alkyl more than doubled the yield of solid polypropylene obtained. In addition, the polypropylene obtained with the lithium butyl promoter consisted of 60% by weight of isotactic polypropylene as compared to about 10% by weight of isotactic form in the solid polymers obtained from the sodium amyl polymerization. Thus, the lithium alkyls are preferred as promoters from the standpoint of yield since, like the lithium metal promoters for ethylene polymerization, higher yields are obtained with lithium than with sodium. In addition, the lithium alkyls are highly effective for polymerizing the higher α-olefins such as propylene and also give a much higher degree of crystallinity in the polymeric product.

EXAMPLE 7

A 2-liter stirred autoclave was charged with a mixture of 12.8 g. of lithium butyl and 2 g. of the reduced 10% molybdenum oxide-alumina catalyst described in Example 1 in 1 liter of purified xylene. The autoclave was heated to 170° C. and 300 g. of 3-methylbutene-1 was pumped in. The mixture was heated at 170° C. for 4 hours, and the resulting solid poly-3-methylbutene-1 was worked up as described in Example 5. The purified poly-3-methyl butene-1 weighed 260 g. After extraction with diisopropyl ether, there remained 158 g. of completely crystalline isotactic poly-3-methylbutene-1 having a melting point of 285–295° C. Thus the catalyst-promoter combinations of this invention are equally effective for polymerizing not only ethylene and propylene but also the other higher straight and branched chain α-monoolefins.

EXAMPLE 8

The α-olefins as defined herein are also polymerizable with other catalyst combinations including other metal oxides or other alkali metal alkyls. Thus, the process of the preceding example was repeated after replacing the molybdenum oxide-alumina catalyst with 2 g. of a partially reduced 7% chromium oxide on gamma-alumina catalyst. The catalyst was thermally reduced prior to use by heating it in an air stream at 500° C. in order to convert part of the chromium to a valence state lower than 6. The poly-3-methylbutene-1 thereby produced weighed 114 g. and was similar in nature to that obtained in the preceding example.

EXAMPLE 9

A catalyst mixture composed of 2 g. of partially reduced 10% molybdenum oxide-alumina catalyst, 12.8 g. of lithium butyl and 1000 ml. of xylene was charged to a 2-liter stirred autoclave. The mixture was heated to 190° C. and contacted with 300 g. of 4-methylpentene-1 at 190° C. and autogenous pressure for 6 hours. The solid polymer was worked up as described in Example 5 to give 239 g. of poly-4-methylpentene-1. After extraction with diisopropyl ether, there remained undissolved 114 g. of completely isotactic poly-4-methylpentene-1 having a melting point of 198–208° C.

The process was then repeated replacing the molybdenum oxide catalyst with 2 g. of a 7% chromium oxide-alumina catalyst which had been thermally reduced in air at 500° C. The poly-4-methylpentene-1 thus produced weighed 82 g. and resembled the material obtained in the preceding process. Similar results were obtained in polymerizing the other α-monoolefins such as butene-1, pentene-1, 5-methylhexene-1, 4,4-dimethylpentene-1, and other well known α-monoolefins known to polymerize to solid polymers with metal oxide catalysts.

Thus by means of this invention high density polyethylene is readily obtained in greatly increased yields, and polypropylene and other higher polyolefins are also obtained in solid form and in excellent yield. The invention also provides in the lithium alkyls, a method whereby a high degree of crystallinity can be achieved in the polymeric products. The polymers embodying the invention usually have molecular weights greater than 1000 and more commonly above 10,000. The achievement of extremely high molecular weight products does not present a problem employing the catalytic process herein described, and molecular weights of as much as 1,000,000 or more can be readily obtained. The polyethylene which is obtained contains a very low percentage of methyl groups per hundred carbon atoms and has a density of more than 0.96 in most cases. The melt index of the polymers can be varied widely as desired by varying the polymerization conditions and may range from about 0.01 to 20 or higher. A typical polyethylene prepared by the process embodying this invention and having a molecular weight of the order of 50,000 has a density of 0.96 or higher, a softening temperature in excess of 130° C. and a stiffness of as much as 100,000 p.s.i. in flexure at 5% deflection (ASTM test D747–50).

Whereas polypropylene in solid form cannot be produced by the usual high pressure polymerization processes employed heretofore for polymerizing ethylene, solid polypropylene is produced in excellent yield using the catalyst, promoter combinations of the present invention. In like manner, the other α-monoolefinic hydrocarbons are readily polymerized to form high melting homopolymers and, if desired, any of the α-monoolefins can be copolymerized in any proportions using the processes of the present invention to give a great variety of materials.

The polyolefins prepared in accordance with the invention can be molded or extruded into flexible plates or films. The products can be extruded to form pipe or tubing of greater rigidity than the usual commercially available products and can be injection molded into a great variety of articles. The polymers can also be cold drawn into ribbons, bands, fibers or filaments of high elasticity and greater rigidity than the lower density polymers. Fibers of high strength can be spun from the molten polyethylene, polypropylene and other polyolefins obtained according to this process. The great strength and high melting point of the higher polyolefins in particular makes them useful for forming high strength cords suitable for use as tire cord or for making film or sheeting useful for a variety of applications including packaging, photographic film base and similar applications.

The invention has been described in detail with particular reference to certain preferred embodiments thereof, but it will be understood that variations and modifications can be effected within the spirit and scope of the invention as described hereinabove and as defined in the appended claims.

We claim:

1. In the polymerization of polymerizable hydrocarbon material consisting of at least one aliphatic α-monoolefin of 2–10 carbon atoms by means of a partially reduced oxide of a metal from Groups 5a and 6A of the Mendeleeff Periodic Table supported on a difficultly reducible metal oxide support, the improvement in enhancing the yield of solid highly crystalline polymer while obviating concomitant formation of low molecular weight greases and waxes which comprises effecting the polymerization in an inert organic liquid vehicle at a temperature of 75–325° C. and a pressure of 200–20,000 p.s.i. employing, as a promoter for said partially reduced metal oxide catalyst, and alkali metal alkyl wherein the alkyl group contains 1–10 carbon atoms, the mole ratio of promoter to catalyst being at least 1:1.

2. In the polymerization of polymerizable hydrocarbon material consisting of at least one aliphatic α-monoolefin of 2–10 carbon atoms by means of a partially reduced oxide of a metal from Groups 5a and 6A of the Mendeleeff Periodic Table supported on a difficultly reducible metal oxide support, the improvement which comprises effecting the polymerization in an inert organic liquid vehicle at a temperature of 100–260° C. and a pressure of 200–2000 p.s.i. employing, as a promoter for said partially reduced metal oxide catalyst, a lithium alkyl of 1–10 carbon atoms in a mole ratio of promoter to catalyst of from 1:1 to 10:1.

3. In the polymerization of polymerizable hydrocarbon material consisting of at least one aliphatic α-monoolefin of 2–10 carbon atoms by means of a partially reduced oxide of a metal from Groups 5a and 6A of the Mendeleeff Periodic Table supported on a difficulty reducible metal oxide support, the improvement which comprises effecting the polymerization in an inert organic liquid vehicle at a temperature of 100–260° C. and a pressure of 200–2000 p.s.i. employing, as a promoter for said partially reduced metal oxide catalyst, a sodium alkyl of 1–10 carbon atoms in a mole ratio of promoter to catalyst of from 1:1 to 10:1.

4. The method of polymerizing hydrocarbon material consisting of at least one α-monoolefin of 2–10 carbon atoms which comprises heating said hydrocarbon material in an inert organic liquid vehicle free of combined oxygen at a temperature of 100–260° C. and a pressure of 200–2000 p.s.i. and in the presence of a partially reduced molybdenum oxide catalyst and an alkali metal alkyl promoter, wherein the alkyl group contains 1–5 carbon atoms, the mole ratio of promoter to catalyst being at least 1:1.

5. The method of polymerizing hydrocarbon material consisting of at least one α-monoolefin of 2–10 carbon atoms which comprises heating said hydrocarbon material in an inert organic liquid vehicle free of combined oxygen at a temperature of 100–260° C. and a pressure of 200–2000 p.s.i. and in the presence of a partially reduced vanadium oxide catalyst and an alkali metal alkyl promoter wherein the alkyl group contains 1–5 carbon atoms, the mole ratio of promoter to catalyst being at least 1:1.

6. The method of polymerizing ethylene which comprises heating a solution of ethylene in an inert hydrocarbon liquid vehicle at a temperature of 100°–260° C. and a pressure of 200–2000 p.s.i. in the presence of a catalyst comprising partially reduced oxide of a metal from Groups 5a and 6A of the Mendeleeff Periodic Table and an alkali metal alkyl promoter containing 1–10 carbon atoms, the ratio of said promoter to said catalyst being at least 1:1.

7. The method of polymerizing propylene which comprises heating a solution of propylene in an inert hydrocarbon liquid vehicle at a temperature of 100°–260° C. and a pressure of 200–2000 p.s.i. in the presence of a catalyst comprising partially reduced oxide of a metal from Groups 5a and 6A of the Mendeleeff Periodic Table and an alkali metal alkyl promoter containing 1–10 carbon atoms, the ratio of said promoter to said catalyst being at least 1:1.

8. The method of polymerizing 3-methylbutene-1 which comprises heating a solution of 3-methylbutene-1 in an inert hydrocarbon liquid vehicle at a temperature of 100°–260° C. and a pressure of 200–2000 p.s.i. in the presence of a catalyst comprising partially reduced oxide of a metal from Groups 5a and 6A of the Mendeleeff Periodic Table and an alkali metal alkyl promoter containing 1–10 carbon atoms, the ratio of said promoter to said catalyst being at least 1:1.

9. The method of polymerizing 4-methylpentene-1 which comprises heating a solution of 4-methylpentene-1 in an inert hydrocarbon liquid vehicle at a temperature of 100°–260° C. and a pressure of 200–2000 p.s.i. in the presence of a catalyst comprising partially reduced oxide of a metal from Groups 5a and 6A of the Mendeleeff Periodic Table and an alkali metal alkyl promoter containing 1–10 carbon atoms, the ratio of said promoter to said catalyst being at least 1:1.

10. The method which comprises heating a solution of an aliphatic α-monoolefinic hydrocarbon containing 2–10 carbon atoms in an inert hydrocarbon liquid vehicle at a temperature of 100–260° C. and a pressure of 200–2000 p.s.i. in the presence of a partially reduced molybdenum oxide catalyst supported on a difficultly reducible metal oxide support and of lithium butyl as promoter, the mole ratio of said lithium butyl to said molybdenum oxide being in the range of from 1:1 to 10:1.

11. The method which comprises heating a solution of an aliphatic α-monoolefinic hydrocarbon containing 2–10 carbon atoms in an inert hydrocarbon liquid vehicle at a temperature of 100–260° C. and a pressure of 200–2000 p.s.i. in the presence of a partially reduced molybdenum oxide catalyst supported on a difficultly reducible metal oxide support and of sodium amyl as promoter, the mole ratio of said sodium amyl to said molybdenum oxide being in the range of from 1:1 to 10:1.

12. The method which comprises heating a solution of an aliphatic α-monoolefinic hydrocarbon containing 2–10 carbon atoms in an inert hydrocarbon liquid vehicle at a temperature of 100–260° C. and a pressure of 200–2000 p.s.i. in the presence of a partially reduced vanadium oxide supported on a difficultly reducible metal oxide support and of lithium butyl as promoter, the mole ratio of said lithium butyl to said vanadium oxide being in the range of from 1:1 to 10:1.

13. The method which comprises heating a solution of ethylene in an inert hydrocarbon liquid vehicle at a temperature of 100–260° C. and a pressure of 200–2000 p.s.i. in the presence of a partially reduced molybdenum oxide supported on gamma alumina and of sodium amyl in a mole ratio of sodium amyl to molybdenum oxide of from 1:1 to 10:1.

14. The method which comprises heating a solution of propylene in an inert liquid hydrocarbon vehicle at a temperature of 100–260° C. and a pressure of 200–2000 p.s.i. in the presence of a partially reduced molybdenum oxide supported on gamma alumina and of lithium butyl in a mole ratio of lithium butyl to molybdenum oxide of from 1:1 to 10:1.

15. The method which comprises heating a solution of ethylene in an inert liquid hydrocarbon vehicle at a temperature of 100–260° C. and a pressure of 200–2000 p.s.i. in the presence of lithium butyl and of partially reduced vanadium oxide supported on gamma alumina, the mole ratio of said lithium butyl to said vanadium oxide being in the range of from 1:1 to 10:1.

16. The method which comprises heating a solution of 3-methylbutene-1 in an inert liquid hydrocarbon vehicle at a temperature of 100–260° C. and a pressure of 200–2000 p.s.i. and in the presence of lithium butyl and of partially reduced molybdenum oxide supported on gamma alumina, the mole ratio of said lithium butyl to said molybdenum oxide being in the range of from 1:1 to 10:1.

17. The method which comprises heating a solution of 4-methylpentene-1 in an inert liquid hydrocarbon vehicle at a temperature of 100–260° C. and a pressure of 200–2000 p.s.i. and in the presence of lithium butyl and of partially reduced molybdenum oxide supported on gamma alumina, the mole ratio of said lithium butyl to said molybdenum oxide being in the range of from 1:1 to 10:1.

References Cited in the file of this patent
UNITED STATES PATENTS

| | | |
|---|---|---|
| 2,721,189 | Anderson et al. | Oct. 18, 1955 |
| 2,726,231 | Field et al. | Dec. 6, 1955 |